(12) United States Patent
Boddakayala et al.

(10) Patent No.: US 11,949,085 B2
(45) Date of Patent: Apr. 2, 2024

(54) HIGH TEMPERATURE INSULATING FOAM FOR HIGH VOLTAGE BATTERY PROTECTION IN ELECTRIC VEHICLES

(71) Applicant: Ford Global Technologies, LLC, Dearborn, MI (US)

(72) Inventors: Bhaskara Rao Boddakayala, Troy, MI (US); Deborah Frances Mielewski, Ann Arbor, MI (US); Alper Kiziltas, Sarikamis (TR); Haibo Zhao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 17/576,358

(22) Filed: Jan. 14, 2022

(65) Prior Publication Data

US 2023/0231229 A1   Jul. 20, 2023

(51) Int. Cl.
*H01M 10/658* (2014.01)
*H01M 50/289* (2021.01)

(52) U.S. Cl.
CPC ....... *H01M 10/658* (2015.04); *H01M 50/289* (2021.01); *H01M 2220/20* (2013.01)

(58) Field of Classification Search
CPC ............ H01M 10/658; H01M 50/289; H01M 50/222; H01M 50/204; H01M 50/209; H01M 50/231; H01M 50/24; H01M 50/242; H01M 50/291; H01M 50/293; H01M 50/581; H01M 2220/20
See application file for complete search history.

(56) References Cited

U.S. PATENT DOCUMENTS

| 8,937,106 | B2 | 1/2015 | Steinke et al. |
| 2014/0128488 | A1 | 5/2014 | Lotti et al. |
| 2021/0163303 | A1 | 6/2021 | Evans et al. |
| 2022/0181715 | A1* | 6/2022 | Jiang .......................... C08J 7/05 |
| 2022/0352574 | A1* | 11/2022 | Lu ........................... B32B 5/024 |

FOREIGN PATENT DOCUMENTS

| WO | 2020083331 | 4/2020 |
| WO | 2020211320 | 10/2020 |

* cited by examiner

*Primary Examiner* — Eugenia Wang
(74) *Attorney, Agent, or Firm* — Burris Law, PLLC

(57) ABSTRACT

A battery system includes a first battery module, a second battery module, and a thermoresistant spacer disposed between the first battery module and the second battery module. The thermoresistant spacer may be a thermoresistant urethane foam or a silicon pad and may include thermoresistant additives, which may include at least one of melamine resin powder, aerogel particles, and milled oxidized polyacrylonitrile fibers. A flame retardant material may be disposed over at least a surface of the thermoresistant spacer.

17 Claims, 4 Drawing Sheets

HIGH TEMPERATURE INSULATING FOAM FOR HIGH VOLTAGE BATTERY PROTECTION IN ELECTRIC VEHICLES

FIELD

The present disclosure relates to battery systems with high temperature insulative properties, particularly for use in electric vehicles.

BACKGROUND

The statements in this section merely provide background information related to the present disclosure and may not constitute prior art.

Referring to FIG. 1, a conventional battery system 20 includes a first battery module 22, a second battery module 24, a thermal interface material 34, a battery cold plate 36, and a conventional foam thermal barrier 26. Conventional foam thermal barriers are produced using highly flammable materials and/or materials that exhibit significant shrinkage or melting when exposed to heat and provide comparatively low thermal insulation within battery systems. The low thermal insulation provided by conventional foam thermal barriers leads to possible flame spread in the event of ignition of the foam thermal barrier as well as increased heat propagation during thermal runaway within battery systems. This is because there is a tradeoff in selecting foam barriers, as during normal operation, battery modules expand and contract, so foam barriers should have adequate force deflection properties to allow the battery modules to expand and contract as necessary.

But battery modules, such as the first battery module 22 and the second battery module 24, can generate hot flammable vent gasses and experience high temperature events (i.e., thermal runaway, thermal propagation) during normal battery operation. During such high temperature events, heat can propagate from one battery module to neighboring battery modules (e.g., from the first battery module 22 to the second battery module 24). This heat propagation can lead to decreased performance of the battery system and fire.

The present disclosure addresses these concerns.

SUMMARY

This section provides a general summary of the disclosure and is not a comprehensive disclosure of its full scope or all of its features.

In one form, a battery system includes a first battery module, a second battery module, and a thermoresistant spacer including thermoresistant additives. The thermoresistant spacer is disposed between the first battery module and the second battery module, and the thermoresistant spacer includes a thermoresistant urethane foam or a silicon pad.

In variations of this battery system, which may be employed individually or in any combination: a thickness of the thermoresistant spacer is greater than or equal to about 1.5 mm to less than or equal to about 75 mm; the thermoresistant additives includes at least one of melamine resin powder, aerogel particles, and milled oxidized polyacrylonitrile fibers; the melamine resin powder is at about 0.5% by weight, the aerogel particles are at greater than or equal to about 0.5% by weight to less than or equal to about 1.5% by weight, and the milled oxidized polyacrylonitrile fibers are at about 1% by weight; the battery system includes a flame retardant material disposed on at least an outer surface of the thermoresistant spacer; a thickness of the flame retardant material is greater than or equal to about 0.3 mm to less than or equal to about 1 mm; the flame retardant material includes at least one of oxidized polyacrylonitrile cloth, basalt cloth, calcium silicate cloth, silicon, glass mat, and aluminum oxide fiber cloth; and the thermoresistant spacer includes a core layer disposed between at least a first outer layer and a second outer layer, and wherein the first outer layer and the second outer layer include the thermoresistant urethane foam or the silicon pad.

In another form of the present disclosure, a battery system includes a first battery module, a second battery module, a thermoresistant spacer, and an oxidized polyacrylonitrile cloth disposed on at least an outer surface of the thermoresistant spacer. The thermoresistant spacer is disposed between the first battery module and the second battery module, and the thermoresistant spacer includes a thermoresistant urethane foam or a silicon pad.

In variations of this battery system, which may be employed individually or in any combination: the thermoresistant spacer further includes thermoresistant additives including melamine resin powder at about 0.5% by weight, aerogel particles at greater than or equal to about 0.5% by weight to less than or equal to about 1.5% by weight, and milled oxidized polyacrylonitrile fibers at about 1% by weight; the thermoresistant spacer includes a central layer, the central layer including the thermoresistant urethane foam or the silicon pad, disposed between at least a first high temperature glass cloth and a second high temperature glass cloth, a first outer layer, and a second outer layer, wherein the first outer layer and the second outer layer include the thermoresistant urethane foam or the silicon pad; a thickness of the oxidized polyacrylonitrile cloth is greater than or equal to about 0.3 mm to less than or equal to about 1 mm; and a thickness of the thermoresistant spacer is greater than or equal to about 1.5 mm to less than or equal to about 75 mm.

In yet another form of the present disclosure, a battery system includes a first battery module, a second battery module, a thermoresistant spacer, and a flame retardant material disposed on at least an outer surface of the thermoresistant spacer. The thermoresistant spacer is disposed between the first battery module and the second battery module. The thermoresistant spacer further includes a thermoresistant urethane foam or a silicon pad including at least one of about 0.5% by weight of melamine resin powder, greater than or equal to about 0.5% by weight to less than or equal to about 1.5% by weight of aerogel particles, and about 1% by weight of milled oxidized polyacrylonitrile fibers.

In variations of this battery system, which may be employed individually or in any combination: the thermoresistant spacer further includes at least one of glass bubbles, mica powder, kaolin powder, milled basalt fibers, and quartz fibers; a thickness of the thermoresistant spacer is greater than or equal to about 1.5 mm to less than or equal to about 75 mm; the battery system further includes at least seven battery modules spaced sequentially apart from one another to form a plurality of channels and a thermoresistant spacer is disposed within each of the plurality of channels; a thickness of the flame retardant material is greater than or equal to about 0.3 mm to less than or equal to about 1 mm; the flame retardant material includes at least one of oxidized polyacrylonitrile cloth, basalt cloth, calcium silicate cloth, silicon, glass mat, and aluminum oxide fiber cloth; and the thermoresistant spacer includes a core layer disposed between at least a first outer layer and a second outer layer, and wherein the first outer layer and the second outer layer include the thermoresistant urethane foam or the silicon pad.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
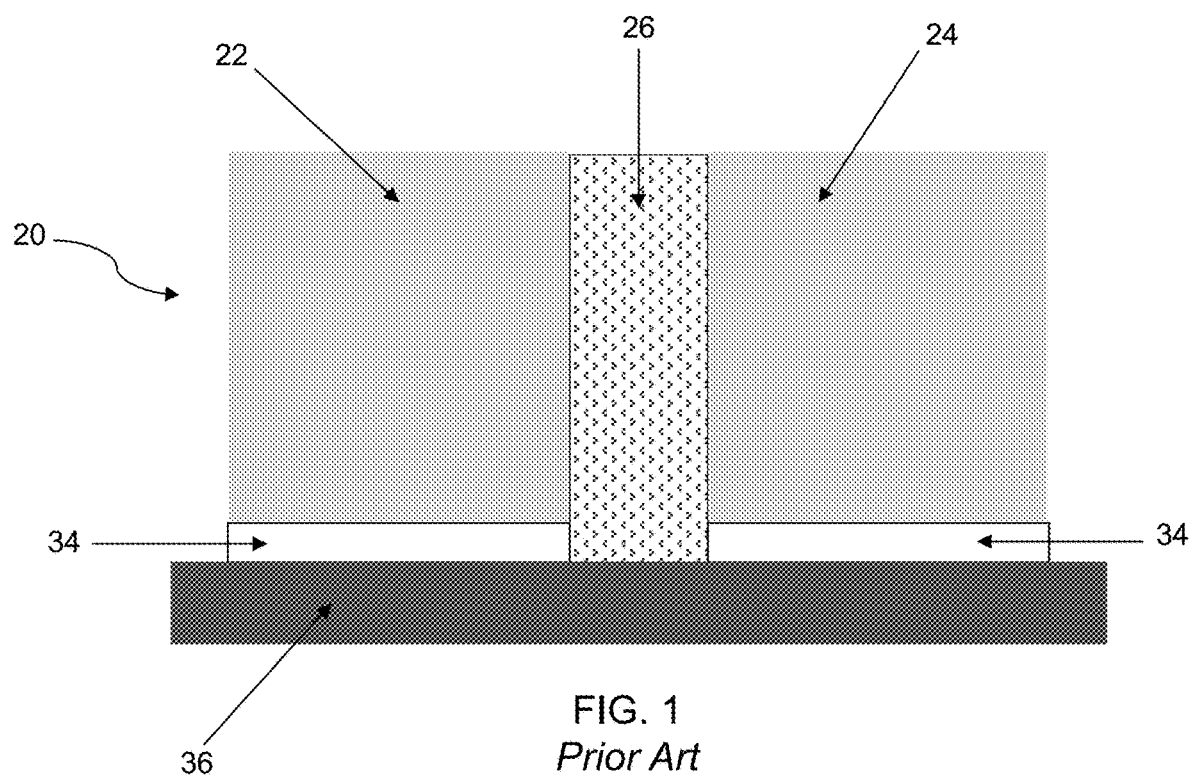
FIG. 1 illustrates a conventional battery system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
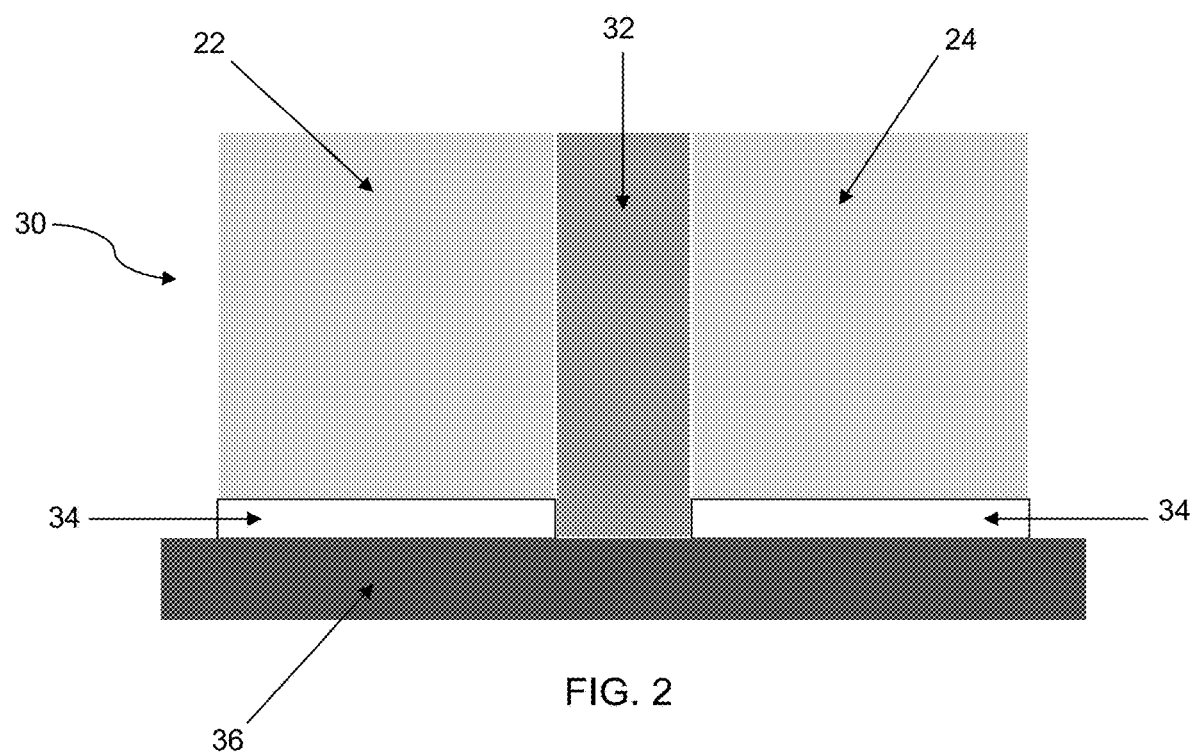
FIG. 2 illustrates a battery system according to one form of the present disclosure.

Referring to FIG. 2, a battery system 30 according to the present disclosure includes a first battery module 22, a second battery module 24, a thermoresistant spacer 32, a thermal interface material 34, and a battery cold plate 36. The thermoresistant spacer 32 is disposed between the first battery module 22 and the second battery module 24 and may be formed of a thermoresistant urethane foam, a silicon pad, or combinations thereof, among others, as explained in greater detail below. In some aspects of the present disclosure, the thickness of the thermoresistant spacer 32 is greater than or equal to about 1.5 mm to less than or equal to about 75 mm.

The thermoresistant spacer 32 provides force deflection properties during normal charge and discharge operation of the battery system 30. More specifically, the thermoresistant spacer 32 compensates for expansion and contraction of the first and second battery modules 22, 24. In addition to force deflection properties, the thermoresistant spacer 32 provides a thermal barrier between the first and second battery modules 22, 24 to isolate high temperature events and reduce heat propagation between the first and second battery modules 22, 24. The thermoresistant spacer 32 is able to withstand high temperatures (ranging from greater than or equal to about 700° C. to less than or equal to about 1,000° C.) produced within the battery system 30 during a thermal runaway event.

In an aspect, the thermoresistant spacer 32 includes thermoresistant additives such as melamine resin powder, aerogel particles, and milled oxidized polyacrylonitrile fibers. In another aspect, the melamine resin powder is at about 0.5% by weight, the aerogel particles are at greater than or equal to about 0.5% by weight to less than or equal to about 1.5% by weight, and the milled oxidized polyacrylonitrile fibers are at about 1% by weight. The thermoresistant additives provide temperature insulation within the battery system 30.

Optionally, the thermoresistant additives includes at least one of the following additional thermoresistant additives: glass bubbles, mica powder, kaolin powder, milled basalt fibers, and quartz fibers. Such additional thermoresistant additives increase mechanical (e.g., compressive strength) and/or thermal properties of the thermoresistant spacer (e.g., thermoresistant spacer 32).

Where it is contemplated that the thermoresistant spacer 32 is a thermoresistant urethane foam, working examples of the thermoresistant urethane foam were produced according to the following procedure (though the following is intended only to be exemplary in nature and other processes for making thermoresistant urethane foams should be appreciated by one of skill in the art). Thermoresistant additives (e.g., melamine resin powder, aerogel particles, milled oxidized polyacrylonitrile fibers, among others, such as the additional thermoresistant additives discussed in part previously) were mixed together and combined with about 100 parts by weight of urethane elastomer to form a urethane elastomer mixture, which was combined with about 88 parts by weight of urethane hardener to form a foam mixture. The urethane elastomer mixture and urethane hardener were combined to form the foam mixture just shortly before (e.g., about 40 seconds) pouring the foam mixture into the mold and was held at approximately room temperature.

The foam mixture expands (for example, about eight times the original volume) inside the mold. The mold generally has the desired shape and dimensions of the thermoresistant spacer. The mold may include vent mechanisms to allow the foam to expand uniformly and to allow air bubbles trapped in the mold to escape and the foam mixture was cured, after expansion of the foam mixture, at greater than or equal to about 50° C. to less than or equal to about 60° C. for about 25 minutes to form a thermoresistant urethane foam. The thermoresistant urethane foam may have an open-cell volume of less than or equal to about 10% by volume of the foam (e.g., a honeycomb-like structure). The thermoresistant urethane foam was then removed from the mold and excess foam was removed as necessary.

Where it is contemplated that the thermoresistant spacer 32 is a silicon pad, working examples of the silicon pad were produced according to the following procedure (though the following is intended only to be exemplary in nature and other processes for making silicon pads should be appreciated by one of skill in the art). Thermoresistant additives (e.g., melamine resin powder, aerogel particles, milled oxidized polyacrylonitrile fibers, among others, such as the additional thermoresistant additives discussed in part previously) were mixed together and combined with about 100 parts by weight of base silicon to form a base silicon mixture. This base silicon mixture was combined with about 10 parts by weight of silicon activator just before (e.g., about 20 minutes) pouring into the mold at approximately room temperature to form a silicon mixture. The mold may include vent mechanisms to allow air bubbles trapped in the mold to escape. The mold generally has the desired shape and dimensions of the thermoresistant spacer. The silicon mixture was then cured in the mold at greater than or equal to about 50° C. to less than or equal to about 60° C. for greater than or equal to about eight hours to less than or equal to about 12 hours to form a silicon pad. The silicon pad was then removed from the mold and excess silicon was removed as necessary.

The battery modules (e.g., the first and second battery modules 22, 24) are exemplary electrified vehicle batteries. The battery modules may be high voltage battery cells outputting electrical power to operate a vehicle and/or other electrical loads of the vehicle. It is further contemplated the battery modules may be other types of energy storage/output devices to electrically power the vehicle.

The thermal interface material 34 allows for energy transfer among the components of the battery system 30 (e.g., the first and second battery modules 22, 24, the thermoresistant spacer 32, and the battery cold plate 36) by providing a pathway for heat to flow away from the batteries (e.g., the first and second battery modules 22, 24). Since the thermal interface material 34 is used near electrical components, such as batteries, the thermal interface material 34 desirably exhibits high dielectric strength. The battery cold plate 36 may be made of lightweight aluminum and stabilizes the battery cell temperature and provides a desired temperature uniformity. The battery cold plate 36 also may provide increased performance and lifespan of the battery.

Figure 3A:
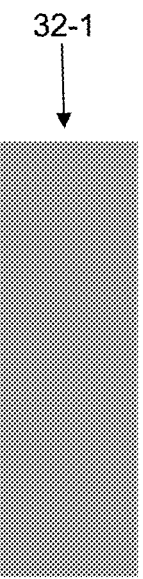
FIG. 3A illustrates one form of a thermal spacer for the battery system according to FIG. 2.
Figure 3B:
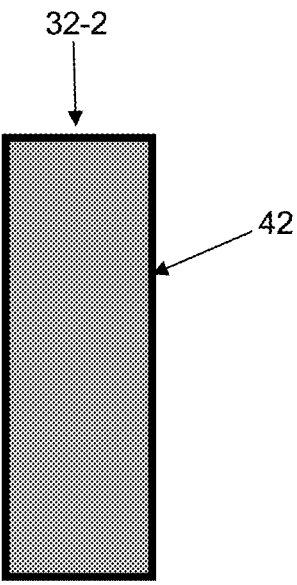
FIG. 3B illustrates another form of a thermal spacer for the battery system according to FIG. 2.

As discussed above, the thermoresistant spacer 32 may be formed of a thermoresistant urethane foam, a silicon pad, or combinations thereof, among others. It should be understood that the thermoresistant spacer 32 may take at least any one of the forms illustrated in FIGS. 3A-3D. Referring now to FIG. 3A, the thermoresistant spacer 32-1 may comprise entirely a thermoresistant urethane foam or a silicon pad. As shown in FIG. 3B, in an aspect the thermoresistant spacer 32-2 further includes a flame retardant material 42 disposed on at least an outer surface of the thermoresistant spacer 32-2, wherein it is contemplated the thermoresistant spacer is formed of the thermoresistant urethane foam or silicon pad described previously. As shown, the flame retardant material 42 is disposed on the entire outer surface of the thermoresistant spacer 32-2. However, the flame retardant material 42 may be disposed on any portion of the outer surface of the thermoresistant spacer 32-2, which may take any appropriate shape or geometry. The flame retardant material 42 can tolerate temperatures up to 1,000° C.

In an aspect, the thickness of the flame retardant material 42 is greater than or equal to about 0.3 mm to less than or equal to about 1 mm. In another aspect of the present disclosure, the flame retardant material 42 includes at least one of oxidized polyacrylonitrile cloth, basalt cloth, calcium silicate cloth, silicon, glass mat, and aluminum oxide fiber cloth. In one form of the present disclosure, the flame retardant material 42 is oxidized polyacrylonitrile cloth.

Figure 3C:
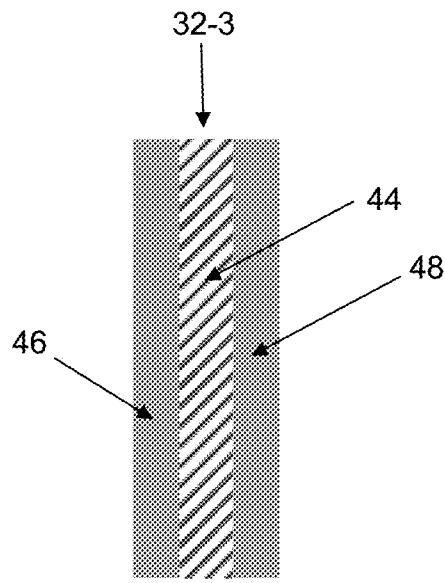
FIG. 3C illustrates a further form of a thermal spacer for the battery system according to FIG. 2.

Referring now to FIG. 3C, the thermoresistant spacer 32-3 may comprise a core layer 44 disposed between at least a first outer layer 46 and a second outer layer 48, the first outer layer 46 and the second outer layer 48 comprise the thermoresistant urethane foam or the silicon pad as described previously. It should be understood that the scope of the present disclosure extends to exemplary thermoresistant spacers wherein the first outer layer 46 and the second outer layer 48 each comprise the thermoresistant urethane foam, each comprise the silicon pad, or comprise different materials (e.g., the first outer layer 46 may comprise the thermoresistant urethane foam and the second outer layer 48 may comprise the silicon pad; however, the disclosure should not be limited such that the first outer layer 46 or the second outer layer 48 comprise either the thermoresistant urethane foam or the silicon pad). The core layer 44 may comprise at least one of a graphene sheet, a high temperature long/short glass with intumescent integrated plastic, high temperature silicon laminated with glass or basalt cloth or a stiff basalt sheet. It should be understood that a flame retardant material (e.g., flame retardant material 42) may be disposed over thermoresistant spacer 32-3 as discussed with respect to the thermoresistant spacer 32-2.

Figure 3D:
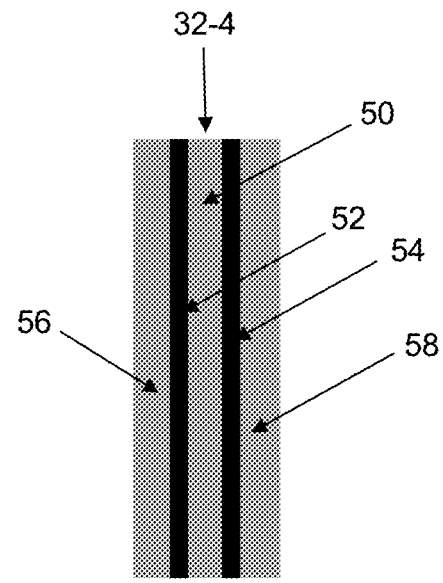
FIG. 3D illustrates yet another form of a thermal spacer for the battery system according to FIG. 2.

Turning now to FIG. 3D, the thermoresistant spacer 32-4 may comprise a central layer 50, the central layer 50 comprising the thermoresistant urethane foam or the silicon pad as described previously, disposed between at least a first high temperature glass cloth 52 and a second high temperature glass cloth 54. The thermoresistant spacer 32-4 may further comprise a first outer layer 56 and a second outer layer 58, the first and second outer layers 56, 58 comprise the thermoresistant urethane foam or the silicon pad described previously, wherein the first outer layer 56 may be disposed near the first high temperature glass cloth 52 and the second outer layer 58 may be disposed near the second high temperature glass cloth 54, respectively, opposite the central layer 50 such that the first outer layer 56 is disposed on a first side of the thermoresistant spacer 32-4 and the second outer layer 58 is disposed on an opposite second side of the thermoresistant spacer 32-4. It should be understood that the scope of the present disclosure extends to exemplary thermoresistant spacers wherein the first outer layer 56 and the second outer layer 58 each comprise the thermoresistant urethane foam, each comprise the silicon pad, or comprise different materials (e.g., the first outer layer 56 may comprise the thermoresistant urethane foam and the second outer layer 58 may comprise the silicon pad; however, the disclosure should not be limited such that the first outer layer 56 or the second outer layer 58 comprise either the thermoresistant urethane foam or the silicon pad). It should be understood that a flame retardant material (e.g., flame retardant material 42) may be disposed over thermoresistant spacer 32-4 as discussed with respect to the thermoresistant spacer 32-2.

Figure 4:
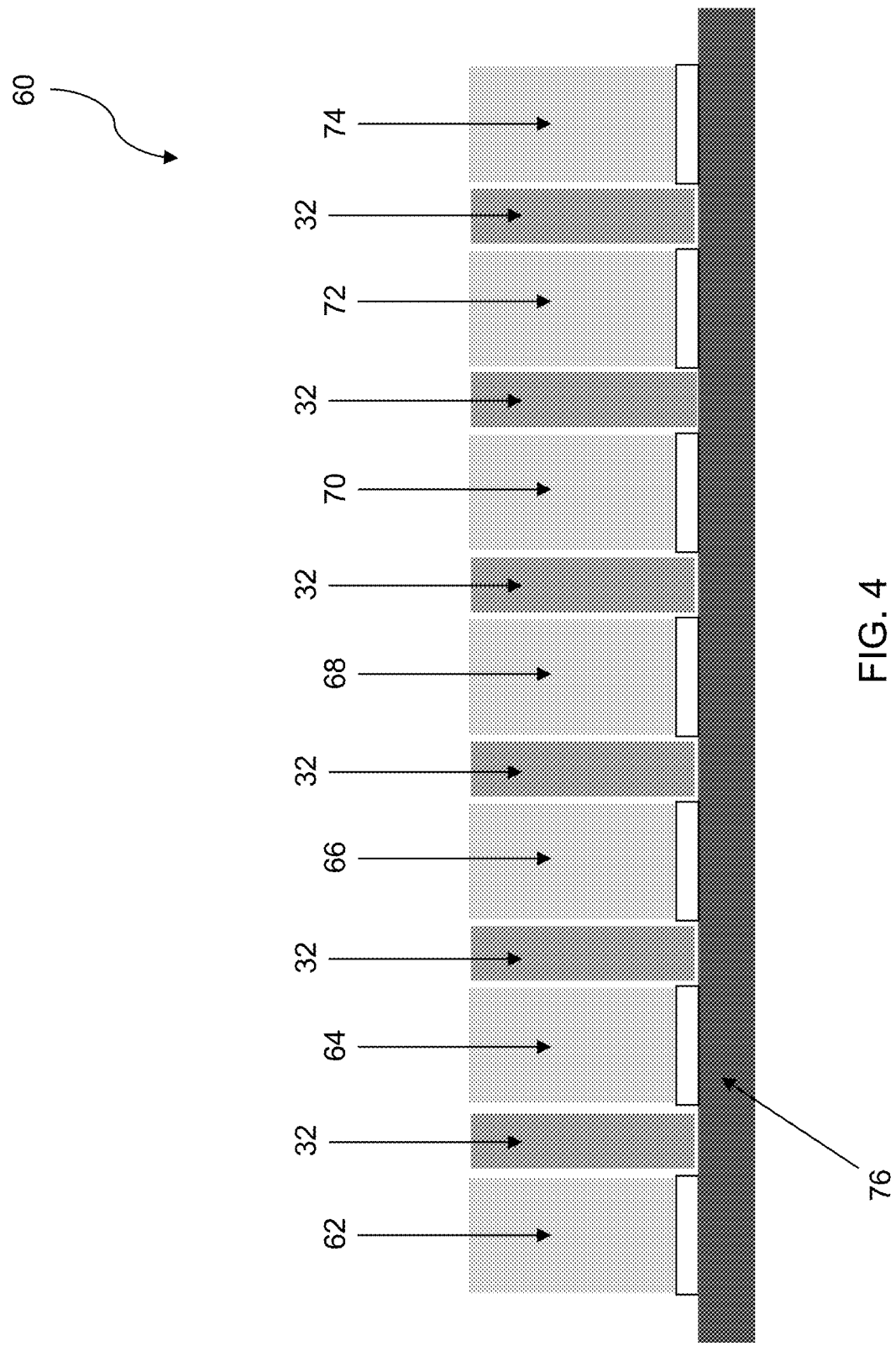
FIG. 4 illustrates a battery system according to a further form of the present disclosure.

In another form of the present disclosure illustrated in FIG. 4, a battery system 60 includes at least seven battery modules 62, 64, 66, 68, 70, 72, 74 sequentially spaced apart from one another to form a plurality of channels. A plurality of thermoresistant spacers (e.g., thermoresistant spacer 32) is disposed within each of the plurality of channels. The battery system 60 further includes a battery cold plate 76 as described previously. As shown, the battery system 60 includes seven battery modules; however, the present disclosure is not limited thereto. In some aspects, the battery system 60 may include greater than or equal to two to less than or equal to seven battery modules. In other aspects, the battery system 60 may include greater than or equal to seven battery modules to less than or equal to 40 battery modules. In yet other aspects, the battery system 60 may include at least 40 battery modules.

The thermoresistant spacers 32 may include a thermoresistant urethane foam or a silicon pad as described previously. The thermoresistant spacers 32 may all be thermoresistant urethane foam, may all be silicon pads, or may be any combination of thermoresistant urethane foam and silicon pads to achieve the desired properties of the battery system. For example, while both the thermoresistant urethane foams and silicon pads each provide adequate force deflection properties and thermoresistance and temperature stability properties, it is contemplated the thermoresistant urethane foam provides even further force deflection properties, and the silicon pads provide even further thermoresistance and temperature stability.

Any or all of the thermoresistant spacers 32 in the battery system 60 may also take any of the forms illustrated in FIGS. 3A-3D and described previously. By way of non-limiting example, in some aspects of the present disclosure, only the first and the last thermoresistant spacers may have a flame retardant material disposed on at least an outer surface of the thermoresistant spacer. Alternatively, in other aspects of the present disclosure, all of the thermoresistant spacers may have a flame retardant material disposed on at least an outer surface of the thermoresistant spacer. In other aspects of the present disclosure, none of the thermoresistant spacers may have a flame retardant material disposed on at least an outer surface of the thermoresistant spacer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery system comprising:
   a first battery module;
   a second battery module; and
   a thermoresistant spacer comprised of thermoresistant additives and disposed between the first battery module and the second battery module, wherein the thermoresistant spacer comprises a thermoresistant urethane foam or a silicon pad,
   wherein the thermoresistant spacer comprises a core layer disposed between at least a first outer layer and a second outer layer, and wherein the first outer layer and the second outer layer comprise the thermoresistant urethane foam or the silicon pad.

2. The battery system according to claim 1, wherein a thickness of the thermoresistant spacer is greater than or equal to about 1.5 mm to less than or equal to about 75 mm.

3. The battery system according to claim 1, wherein the thermoresistant additives comprise at least one of melamine resin powder, aerogel particles, and milled oxidized polyacrylonitrile fibers.

4. The battery system according to claim 3, wherein the melamine resin powder is at about 0.5% by weight, the aerogel particles are at greater than or equal to about 0.5% by weight to less than or equal to about 1.5% by weight, and the milled oxidized polyacrylonitrile fibers are at about 1% by weight.

5. The battery system according to claim 1 further comprising a flame retardant material disposed on at least an outer surface of the thermoresistant spacer.

6. The battery system according to claim 5, wherein a thickness of the flame retardant material is greater than or equal to about 0.3 mm to less than or equal to about 1 mm.

7. The battery system according to claim 5, wherein the flame retardant material comprises at least one of oxidized polyacrylonitrile cloth, basalt cloth, calcium silicate cloth, silicon, glass mat, and aluminum oxide fiber cloth.

8. A battery system comprising:
   a first battery module;
   a second battery module;
   a thermoresistant spacer disposed between the first battery module and the second battery module, wherein the thermoresistant spacer comprises a thermoresistant urethane foam or a silicon pad; and
   an oxidized polyacrylonitrile cloth disposed on at least an outer surface of the thermoresistant spacer,
   wherein the thermoresistant spacer further comprises thermoresistant additives comprising:
   melamine resin powder at about 0.5% by weight;
   aerogel particles at greater than or equal to about 0.5% by weight to less than or equal to about 1.5% by weight; and
   milled oxidized polyacrylonitrile fibers at about 1% by weight.

9. The battery system according to claim 8, wherein the thermoresistant spacer comprises:
   a central layer, the central layer comprising the thermoresistant urethane foam or the silicon pad, disposed between at least a first high temperature glass cloth and a second high temperature glass cloth;
   a first outer layer; and
   a second outer layer,
   wherein the first outer layer and the second outer layer comprise the thermoresistant urethane foam or the silicon pad.

10. The battery system according to claim 8, wherein a thickness of the oxidized polyacrylonitrile cloth is greater than or equal to about 0.3 mm to less than or equal to about 1 mm.

11. The battery system according to claim 8, wherein a thickness of the thermoresistant spacer is greater than or equal to about 1.5 mm to less than or equal to about 75 mm.

12. A battery system comprising:
    a first battery module;
    a second battery module;
    a thermoresistant spacer disposed between the first battery module and the second battery module, wherein the thermoresistant spacer comprises a thermoresistant urethane foam or a silicon pad comprising at least one of about 0.5% by weight of melamine resin powder, greater than or equal to about 0.5% by weight to less than or equal to about 1.5% by weight of aerogel particles, and about 1% by weight of milled oxidized polyacrylonitrile fibers; and
    a flame retardant material is disposed on at least an outer surface of the thermoresistant spacer,
    wherein the thermoresistant spacer comprises a core layer disposed between at least a first outer layer and a second outer layer, and wherein the first outer layer and the second outer layer comprise the thermoresistant urethane foam or the silicon pad.

13. The battery system according to claim 12, wherein the thermoresistant spacer further comprises at least one of glass bubbles, mica powder, kaolin powder, milled basalt fibers, and quartz fibers.

14. The battery system according to claim 12, wherein a thickness of the thermoresistant spacer is greater than or equal to about 1.5 mm to less than or equal to about 75 mm.

15. The battery system according to claim 12, further comprising at least seven battery modules spaced sequentially apart from one another to form a plurality of channels and a thermoresistant spacer is disposed within each of the plurality of channels.

16. The battery system according to claim 12, wherein a thickness of the flame retardant material is greater than or equal to about 0.3 mm to less than or equal to about 1 mm.

17. The battery system according to claim 12, wherein the flame retardant material comprises at least one of oxidized polyacrylonitrile cloth, basalt cloth, calcium silicate cloth, silicon, glass mat, and aluminum oxide fiber cloth.

* * * * *